June 3, 1969
C. T. LEWIS
3,447,409
PAPER CUTTER
Filed Jan. 23, 1967
Sheet 1 of 2
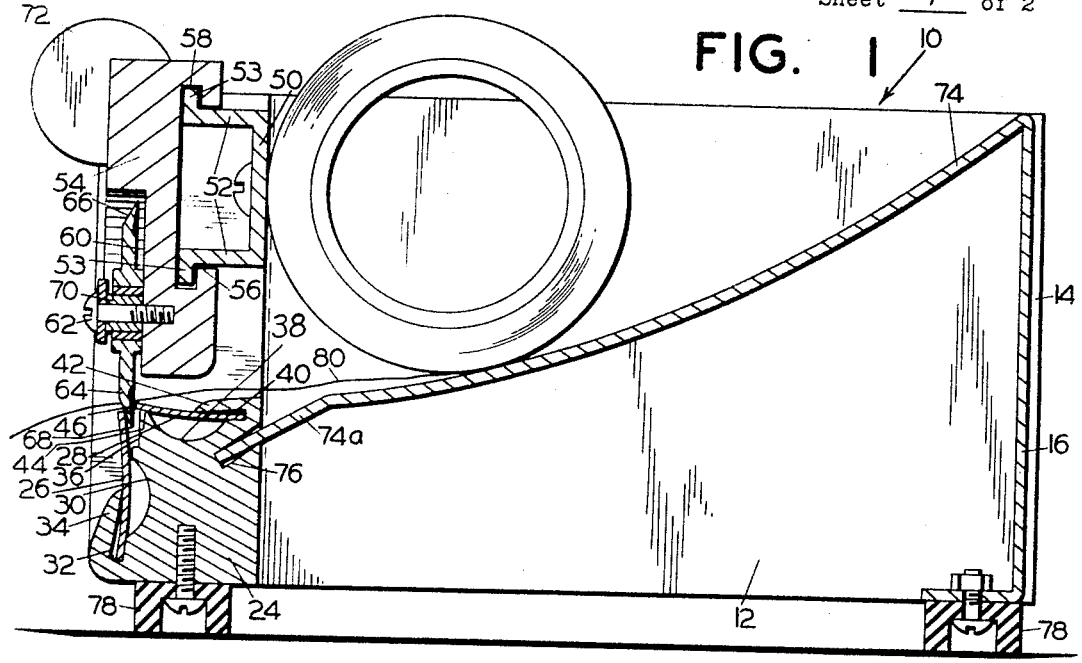
FIG. 1
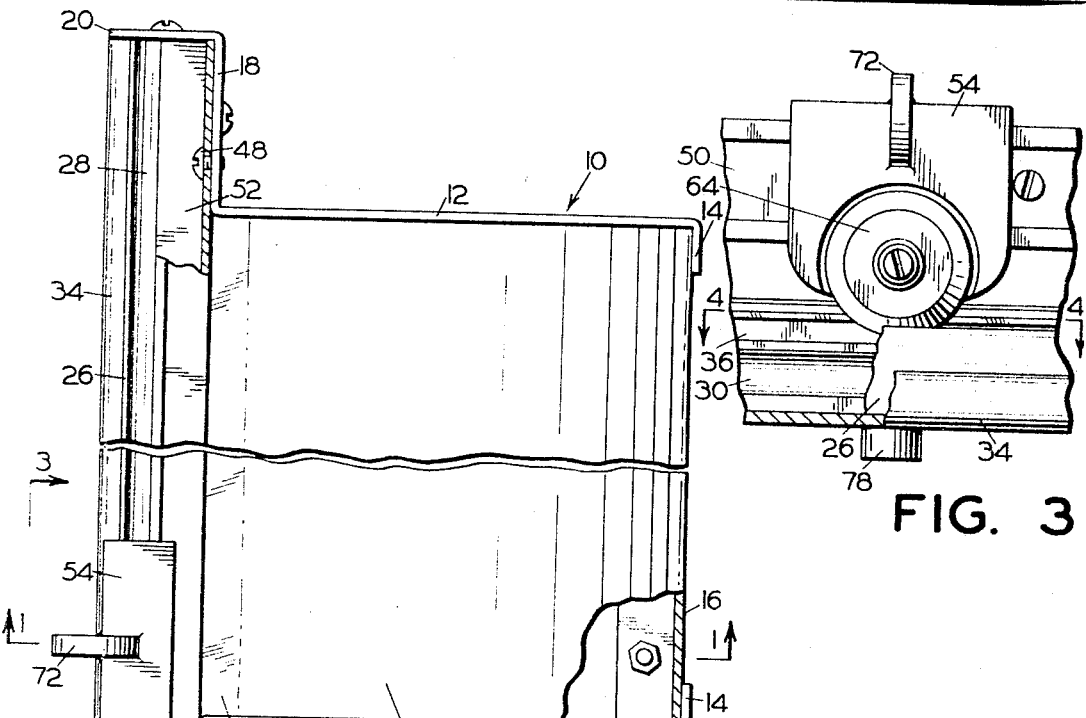
FIG. 2
FIG. 3
INVENTOR.
CLARENCE T. LEWIS
BY Eugene M. Eckelman
ATTORNEY

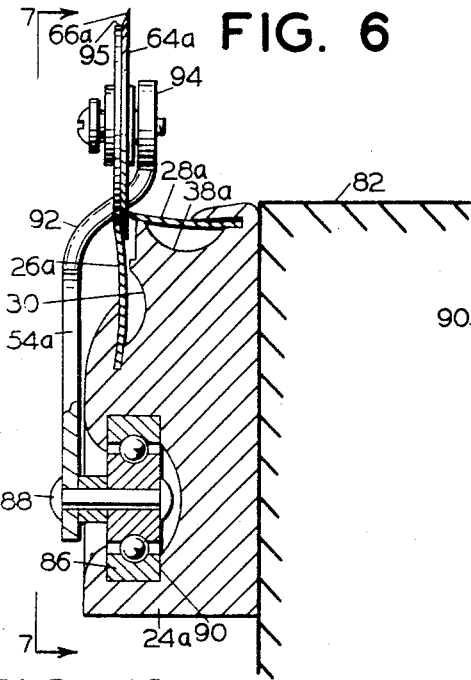
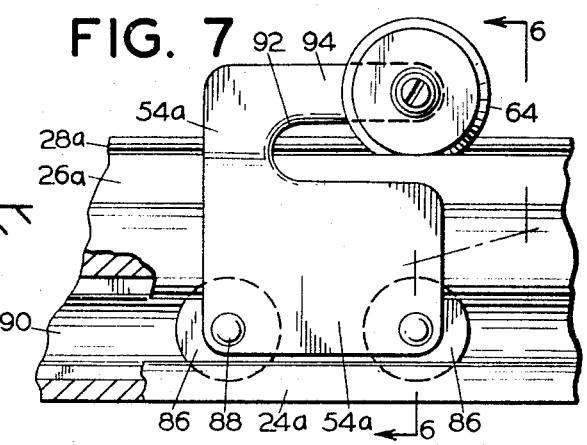
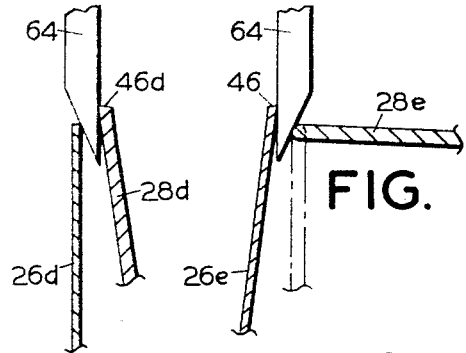
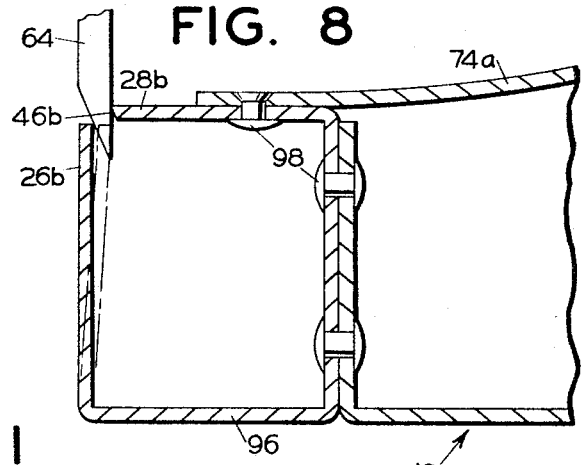
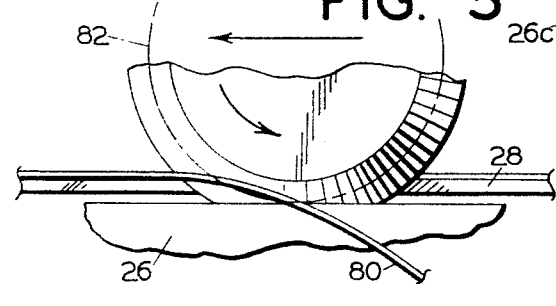
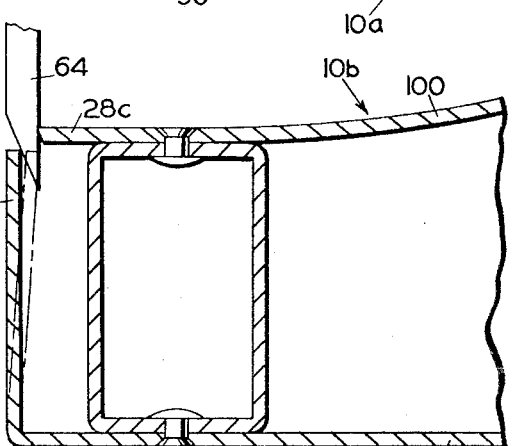
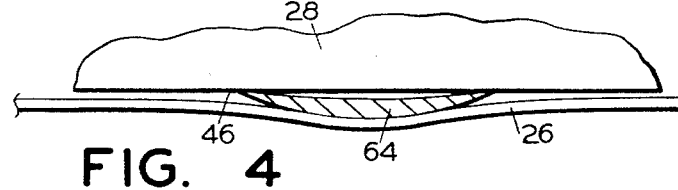

United States Patent Office 3,447,409
Patented June 3, 1969

3,447,409
PAPER CUTTER
Clarence T. Lewis, 833 E. Jackson,
Medford, Oreg. 97501
Filed Jan. 23, 1967, Ser. No. 611,080
Int. Cl. B26d 1/18, 5/10; B23d 19/00
U.S. Cl. 83—485                              8 Claims

ABSTRACT OF THE DISCLOSURE

A paper cutter has a base provided with a carrier movable in a lateral direction on the base. A shear wheel is rotatably supported on the carrier and has a beveled cutting edge. Two cutter blades are supported on the base with one blade engaging one side of the shear wheel and the other blade engaging the other side. The wheel engaging portions of the blades are mounted so that they are normally closer together than the thickness of the portion of the shear wheel which they engage and one of the blades is flexible for flexing away from the other blade to have engageable disposition against the shear wheel.

---

This invention pertains to paper cutters and more particularly is concerned with a cutter of the type wherein paper is laid across a cutting edge and movable shearing means is operative to be advanced along such cutting edge to cut the paper.

A primary objective of the present invention is to provide a paper cutter having a novel structure which is inexpensive to manufacture and easy to use.

Another object is to provide a paper cutter which utilizes novel cutting means in the form of a shear wheel and cooperating spring and anvil blades.

A more particular object is to provide a paper cutter which utilizes a shear wheel held precisely in a cutting path by cooperating spring and anvil blades, where said shear wheel need not have expensive precision mounting and guidance along a cooperating cutting edge.

Another object is to provide a paper cutter which employs a novel structure and arrangement of body member and spring and anvil blades wherein the latter blades are held in place by friction engagement in recesses in the body member with projecting ends thereof selectively positioned for engagement by a shear wheel.

Still another object is to provide a paper cutter which employs in combination a shear wheel and spring and anvil blades arranged such that the shear wheel is driven at an over-running speed with relation to its cutting speed on the anvil blade.

Additional objects and advantages will become apparent from the following description taken in connection with the accompanying drawings which illustrate a preferred form of the device.

In the drawings:

FIGURE 1 is a cross sectional view of one form of the present paper cutter, taken on the line 1—1 of FIGURE 2;

FIGURE 2 is a foreshortened plan view, partly broken away, of the structure of FIGURE 1;

FIGURE 3 is a fragmentary, elevational view, also partly broken away, taken on the line 3—3 of FIGURE 2;

FIGURE 4 is an enlarged sectional view taken on the line 4—4 of FIGURE 3 illustrating the operation of a shear wheel in combination with spring and anvil plates;

FIGURE 5 is a fragmentary, enlarged face view of the shear wheel and illustrating further the operation thereof with the spring and anvil blades;

FIGURE 6 is a cross sectional view of a second form of the invention, taken on the offset line 6—6 of FIGURE 7;

FIGURE 7 is a fragmentary elevational view of the embodiment of FIGURE 6, taken on the line 7—7 of FIGURE 6;

FIGURE 8 is a cross sectional view showing another form of the invention;

FIGURE 9 is a cross sectional view of still another form of the invention;

FIGURE 10 is a cross sectional view showing an alternative arrangement of shear wheel, spring, and anvil blades which form a part of the instant invention; and FIGURE 11 is a view similar to FIGURE 10 but showing still another arrangement of the shear wheel, spring, and anvil blades.

Referring now in particular to the drawings, and first to FIGURES 1 through 4, there is shown an embodiment of the invention including a base frame 10 which has a pair of side walls 12 assuming a shape in plan as shown in FIGURE 2. More particularly, side walls 12 have inwardly bent rear flanges 14 to which is secured, as by welding, a rear wall 16. The forward end of the side walls 12 are bent so as to have lateral extensions 18 leading to forward extensions 20.

Forming a part of the base frame 10, or secured thereto as by means of end screws 22 extending through forward extensions 20, is a body member or cutting head 24. This body member is disposed adjacent the lower end of the frame 10 and is of the cross-sectional shape shown in FIGURE 1 for holding a spring blade 26 and an anvil blade 28. For this purpose, the body member 24 has a full length recess portion 30 along its front surface and an extension or socket 32 of such recess which extends downwardly into the body portion of the member 24 and which forms a full length front tab 34. The face surface of the body member 24 at the upper portion thereof has a full length notch 36.

The upper surface of the body member 24 has a configuration in cross section somewhat similar to the front surface in that it has a full length recess 38 which has a horizontal extension or socket 40 forming an upper tab 42. A portion of the top surface of the body member, namely, that portion forward of the recess 38 and designated by the numeral 44, comprises a seat for the anvil blade 28 as will now be more apparent.

The recesses 30 and 38 are constructed such that the extensions 32 and 40 thereof, respectively, as well as their respective associations with the tabs 34 and 42 provide a friction grip on the spring and anvil blades. These members are installed by forcing them into their respective recesses and are not otherwise fastened. When mounted in their respective recesses, the blades 26 and 28 are caused to be bent slightly so that the walls of said recesses frictionally grip them. The blades 26 and 28 and the recesses are of selective dimensions such that when said blades are fully seated the projecting edges thereof are just short of engagement, the upper edge of the blade 26 being just below the plane of the bottom surface of blade 28. Blade 26 is formed of a spring steel or other material which permits flexing thereof, and the blade 28 is formed of a material which may flex slightly for insertion in the recess 38 but importantly it has a case hardened, tapered forward cutting edge 46.

Secured to the lateral extensions 18 of the side walls 12, as by screws 48, is a track member 50 having forwardly extending arms 52, FIGURE 1, provided with outwardly directed flanges 53. Slidably supported on the track member 50 is a wheel carrier 54, FIGURES 1, 2 and 3, this carrier having a recess 56 which leads inwardly from the rear surface thereof and which has opposed vertical extensions 58 to form a locked but slidable mounting engagement on the flanged arms 52. Supported on an idented front surface portion 60 of the wheel carrier 54 by means of a threaded axle 62 is a hollow-ground shear wheel 64 having a beveled peripheral portion 66 which as best seen in FIGURE 1 extends between the projecting ends of the blades 26 and 28. The beveled portion 66 terminates in a cutting edge 68. The journaled support of the shear wheel 64 on the axle 62 includes a sleeve 70 mounted on the axle 62 which is of greater length than the thickness of the shear wheel such that the latter has some axial floating movement as will be described in greater detail hereinafter.

Wheel carrier 54 has a hand knob 72 thereon for manually sliding the carrier laterally on the track 50 in a paper cutting operation. Frame 10 also has a cradle or baffle 74 which extends downwardly at an angle from the upper end of the rear wall 16 and into a mounting recess 76 in the rear surface of the body member 24. In a preferred construction, the cradle 74 has a concave curvature and a straight walled front portion 74a, the portion 74a being received in recess 76. The present cutter is supported on foot members 78 suitably secured thereto.

For cutting paper 80, a roll thereof is placed on the cradle, as shown in FIGURE 1, and after placing the wheel carrier 54 at one end of the base frame the length of paper desired to be severed from the roll is pulled forwardly and the cut line placed at the forward edge of anvil blade 28. The carrier 54 is then moved across the cutter to shear the paper. In accordance with principles of the present invention, the shear wheel 64 rolls along the cutting edge 46 of the anvil blade 28 to shear the paper, and a positive cutting association is maintained by the spring blade 26 which as stated hereinbefore engages tapered portion 66 of the wheel to hold the latter in cutting position across the cutter. In accordance with this structure, the shear wheel 46 does not have to be mounted and maintained in a precise axial position such that it has to be in engagement with the cutting edge 46 since the spring blade 26 always maintains it in such positive cutting position, FIGURE 4. Thus, the shear wheel 64 can be axially movable on the axle 62, as shown, and still produce a good cutting function. FIGURE 4 illustrates engagement of the shear wheel with the anvil blade 28 and the positioning engagement thereof by the spring blade 26.

In addition to providing a good cutting action, the present arrangement of shear wheel and blades 26 and 28 causes the wheel to grip the paper while it is being cut so that the paper will remain in the aligned position at which it was placed. More particularly, and as best seen in FIGURE 5, after the paper has been cut the portion immediately following the cut of the wheel is turned down slightly and gripped between the wheel and the spring blade 26, this action serving to grasp the paper and hold the sheet thereof in a set position when being cut. The gripping relation of the wheel and spring blade 26 with the paper also keeps the wheel rotating and does not permit an undesirable, non-rotating sliding movement thereof. Also, such gripping relation reduces the wear factor since the metal to metal contact of the spring blade and wheel is lessened. The cutting function of the wheel is accomplished by its outer edge 68 but the engagement of the blade 26 thereagainst is radially inwardly from said edge, designated by the phantom line 82, so that the wheel is caused by said blade 26 to rotate faster than the normal rolling speed along the edge 46. This will cause the cutting edge of the wheel to spin past the cutting edge 46 of the blade 28 which serves to provide a slicing action at the shearing point.

FIGURES 6 and 7 show a modified form of the invention. In this embodiment the cutter comprises simply a body member 24a which may of course be connected to a frame, such as the frame 10 in FIGURE 1, but preferably is merely anchored suitably to a support 82 such as a table. The upper portion of the body member 24a, as in FIGURE 1, has a recess 30a in its front surface and a recess 38a in its upper surface for holding spring and anvil blades 26a and 28a, respectively. In this embodiment, a shear wheel 64a is supported above the body member 24a and in engagement with the blades 26a and 28a by means of a carrier 54a having a pair of roller wheels 86 journaled on shafts 88. Body member 24a has an elongated recess 90 from end to end which is dimensioned and arranged to form a track or guide for the roller wheels 86 whereby the carrier 54a is movable from side to side in cutting operations.

As best seen in FIGURE 7, the carrier 54a has a horizontal cut-out portion 92 leading inwardly from one side edge and the shear wheel 64a is supported on the end of an arm 94 formed by the cut-out portion 92. The upper end of the carrier which includes the arm 94 is bent rearwardly, FIGURE 6, for aligning the shear wheel with the blades 26a and 28a. The cut-out portion 92 prevents the edge of the paper which is being cut off from hanging up on the carrier as it moves in a cutting stroke since the paper slides along the outer surface of the carrier, it being assumed that the carrier moves from left to right, FIGURE 7, in its cutting stroke. The shear wheel 64a in the FIGURE 6 embodiment has a beveled peripheral portion 66a but also includes a shoulder 95, at the inner end of the bevel which extends substantially parallel to the axis of the shear wheel. The parts are dimensioned and arranged such that the spring blade 26a engages the beveled portion 66a just outwardly from the shoulder 95 and this shoulder causes the cut edge after release of the latter from between the wheel and the spring blade, to curl upwardly and be by-passed by the carrier more readily.

FIGURES 8 and 9 show further embodiments of the invention. In FIGURE 8, the spring blade 26b and the anvil blade 28b form the front and top wall, respectively, of a hollow housing 96. Thus, in the formation of such housing it is bent into the shape shown with the one corner, comprising the top front corner being disconnected and the front edge of the blade 28b being case hardened and comprising the cutting edge therefor. In the formation of the housing 96, as by bending, the upper edge of the front wall 26b is biased toward the edge of the other blade and would normally assume the position shown in phantom lines. The wall 26b is sprung outwardly, however, by the shear wheel 64a. It is thus important that the housing be formed of a spring metal whereby the wall 26b thereof performs the same function as spring blades in the other embodiments.

Housing 96 may be directly attached to a support as in FIGURE 6 or may, as shown, be a part of a frame member 10a and a cradle 74a, the housing being suitably connected to such frame member as by rivets 98.

Another form of the invention is illustrated in FIGURE 9 wherein a frame member 10b has a top wall 100 which terminates at its front in an anvil blade 28c and has a bottom wall 102 from which is bent a front upright wall 26c. The wall 26c is biased toward a position wherein its upper edge is closely adjacent the cutting edge of blade 28c but is sprung outwardly by the shear wheel 64 to accomplish the intended purpose. Frame 10b has a transverse, box-like frame member 104 secured as by rivets 106 to the top wall 100 and bottom wall 102.

FIGURE 10 illustrates an alternative angular relationship of the spring and anvil blades. In this embodiment the spring blade is designated by the numeral 26d and the anvil blade is designated by the numeral 28d. The spring blade is disposed in substantially the same position as hereinbefore shown, but the anvil blade instead of being substantially horizontal is inclined downwardly to a position almost parallel with the spring blade. The cooperation of the two blades with the shear wheel 64 is substantially the same however, it is understood that the spring blade 26d similarly is arranged to bear against the tapered surface of the shear wheel and urge the wheel against the anvil blade. The two blades 26d and 28d may have suitable mounting as in other embodiments.

FIGURE 11 illustrates still another arrangement wherein the spring blade 26e has the cutting edge 46 and the anvil blade 28e bears on the tapered surface of the shear wheel. In this arrangement the blade 28e is substantially horizontal and the blade 26e is angled outwardly with relation to the plane of the wheel 64. It is apparent here that the blade 28e comprises merely an abutment for the wheel 64 in the one direction and the blade 26e performs the dual function of holding the wheel against the abutment and at the same time cooperating with the wheel to cut the material.

In accordance with the present invention, there is provided a paper cutter which is simplified in construction and inexpensive to manufacture and furthermore is easy to use. Also, the arrangement of the blades 26 and 28 as associated with the shear wheel produce an improved cutting operation in that the paper is held in proper alignment while being cut and furthermore is cut sharply and cleanly.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A paper cutter comprising a base frame, a carrier mounted on said base frame, for lateral movement, a shear wheel on said carrier, said shear wheel having a peripheral beveled surface terminating in a peripheral cutting edge, a first blade mounted on said base frame, a second blade mounted on said base frame, said two blades having projecting end portions terminating adjacent to each other, one of said blades having end engagement with the beveled surface of said shear wheel and the other of said blades having end engagement with the opposite side of said wheel whereby said wheel is held in a fixed axial position but rotatably therebetween, one of said blades having a cutting edge engageable by the cutting edge of said shear wheel for cutting paper by lateral movement of said carrier, the end portions of said blades being normally closer together than the thickness of the portion of the shear wheel which they engage and one of said blades being flexible for flexing engageable disposition around said shear wheel.

2. The paper cutter of claim 1 wherein said second blade comprises the flexible blade and engages the beveled surface of said shear wheel and said first blade engages the opposite side of the shear wheel, the said first blade being provided with the cutting edge for engagement by the cutting edge of said shear wheel to cut paper.

3. The paper cutter of claim 1 wherein said first blade comprises the flexible blade and engages the beveled surface of said shear wheel and said second blade engages the opposite side of the shear wheel, the said second blade being provided with the cutting edge for engagement by the cutting edge of said shear wheel to cut paper.

4. The paper cutter of claim 1 wherein said base frame includes track means for movably supporting said carrier, an axle on said carrier rotatably supporting said shear wheel, said shear wheel having free axial adjustable movement on said shaft and being held in cutting position by said two blades on opposite sides thereof.

5. The paper cutter of claim 1 wherein said base member has front and top portions, means in said front portion of the base member defining a socket for frictionally holding said second blade in a position substantially parallel with said shear wheel with the end thereof engaging said beveled surface, and means in said top portion defining a socket for frictionally holding said first blade angularly to the shear wheel with its end in engagement with the other side of the wheel.

6. The paper cutter of claim 1 wherein said base frame is of hollow construction and has a top wall and a front wall, the corner of said base frame between said top wall and said front wall being opened with the ends of said top and front wall terminating adjacent to each other and forming said first and second blades respectively, the said front wall having spring characteristics whereby to be flexed away from the end of the top wall for receiving the shear wheel between it and said top wall.

7. The paper cutter of claim 6 wherein the end of said front wall engages the beveled surface of said shear wheel and the end of said top wall engages the opposite side of the shear wheel, the said top wall being provided with the cutting edge for encouragement by the cutting edge of said shear wheel to cut paper.

8. The paper cutter of claim 1 wherein said base frame is of hollow construction and has integral bottom, top and front walls, a corner of said base frame between said top wall and said front wall being open with the ends of said top and front walls terminating adjacent to each other and forming said first and second blades respectively, the said front wall being connected to said bottom wall by a corner bend and having spring characteristics whereby to be flexed outward from the end of the top wall for receiving the shear wheel between it and said top wall.

References Cited

UNITED STATES PATENTS

| 1,541,155 | 6/1955 | Kroesen | 83—485 X |
| 1,708,585 | 4/1929 | McCarthy | 83—485 X |
| 1,774,225 | 8/1930 | Bredin | 83—485 |

FOREIGN PATENTS

| 814,591 | 3/1937 | France. |
| 441,550 | 1/1936 | Great Britain. |

JAMES M. MEISTER, *Primary Examiner.*

U.S. Cl. X.R.

83—583, 614, 649